(12) United States Patent
Shinoda et al.

(10) Patent No.: US 9,755,460 B2
(45) Date of Patent: Sep. 5, 2017

(54) POWER RECEPTION DEVICE, POWER TRANSMISSION DEVICE AND WIRELESS POWER TRANSMISSION SYSTEM

(71) Applicant: MURATA MANUFACTURING CO., LTD., Nagaokakyo-Shi, Kyoto-fu (JP)

(72) Inventors: Satoshi Shinoda, Nagaokakyo (JP); Keiichi Ichikawa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 634 days.

(21) Appl. No.: 14/228,927

(22) Filed: Mar. 28, 2014

(65) Prior Publication Data

US 2014/0210276 A1   Jul. 31, 2014

Related U.S. Application Data

(63) Continuation of application No. PCT/JP2012/077182, filed on Oct. 22, 2012.

(30) Foreign Application Priority Data

Oct. 28, 2011  (JP) ................................. 2011-237679

(51) Int. Cl.
  *H01F 27/42*  (2006.01)
  *H01F 37/00*  (2006.01)
  (Continued)

(52) U.S. Cl.
  CPC .............. *H02J 17/00* (2013.01); *H02J 5/005* (2013.01); *H02J 7/025* (2013.01); *H04B 5/0012* (2013.01);
  (Continued)

(58) Field of Classification Search
  CPC .. H02J 17/00; H02J 5/005; H02J 7/025; H02J 7/0044; H04B 5/0031; H04B 5/0012; H04B 5/0037; H04B 5/0081
  (Continued)

(56) References Cited

U.S. PATENT DOCUMENTS 8,587,156 B2   11/2013  Camurati et al.
2010/0081379 A1*  4/2010  Cooper ................. H01Q 1/248
                                                    455/41.1
(Continued)

FOREIGN PATENT DOCUMENTS

CN  101416411 A  4/2009
CN  101964678 A  2/2011
(Continued)

OTHER PUBLICATIONS

Written Opinion and International Search Report issued in PCT/JP2012/077182 mailed on Dec. 11, 2012.

*Primary Examiner* — Richard Tan
(74) *Attorney, Agent, or Firm* — Arent Fox LLP (57) ABSTRACT

A mobile terminal device performs short range communication with an R/W device and receives power from a power transmission device. The mobile terminal device includes a coil antenna, an RFID IC circuit that performs short range communication with the outside via the coil antenna, a charging circuit that receives power received by the coil antenna which is capacitively coupled with a passive electrode and switches that switch to a short range communication state in which short range communication is performed via the coil antenna or a power reception state in which power is received via the coil antenna. Accordingly, a power reception device, a power transmission device and a wireless power transmission system are provided with which wireless power transmission can be realized without (Continued)

obstructing size reduction by giving a single member two functions.

14 Claims, 7 Drawing Sheets

(51) Int. Cl.
| | | |
|---|---|---|
| *H01F 38/00* | (2006.01) | |
| *H02J 17/00* | (2006.01) | |
| *H04B 5/00* | (2006.01) | |
| *H02J 7/02* | (2016.01) | |
| *H02J 5/00* | (2016.01) | |
| *H02J 7/00* | (2006.01) | |

(52) U.S. Cl.
CPC ......... *H04B 5/0031* (2013.01); *H04B 5/0037* (2013.01); *H04B 5/0081* (2013.01); *H02J 7/0044* (2013.01)

(58) Field of Classification Search
USPC .......................................... 307/104
See application file for complete search history.

(56) References Cited

U.S. PATENT DOCUMENTS

| | | | |
|---|---|---|---|
| 2010/0311327 A1* | 12/2010 | Hamada | H02J 7/025 455/41.1 |
| 2011/0018358 A1 | 1/2011 | Kozakai | |
| 2011/0115303 A1* | 5/2011 | Baarman | H02J 17/00 307/104 |
| 2011/0291819 A1* | 12/2011 | Kaeriyama | H01L 23/48 340/286.01 |
| 2012/0056485 A1* | 3/2012 | Haruyama | H02J 5/005 307/104 |
| 2012/0262005 A1 | 10/2012 | Camurati et al. | |

FOREIGN PATENT DOCUMENTS

| | | |
|---|---|---|
| JP | 6-187514 A | 7/1994 |
| JP | 2005-062908 A | 3/2005 |
| JP | 2009-531009 A | 8/2009 |
| JP | 2011-029799 A | 2/2011 |

* cited by examiner

POWER RECEPTION DEVICE, POWER TRANSMISSION DEVICE AND WIRELESS POWER TRANSMISSION SYSTEM

CROSS-REFERENCE TO RELATED APPLICATIONS

The present application is a continuation of PCT/JP2012/077182 filed Oct. 22, 2012, which claims priority to Japanese Patent Application No. 2011-237679, filed Oct. 28, 2011, the entire contents of each of which are incorporated herein by reference.

FIELD OF THE INVENTION

The present invention relates to a power reception device, a power transmission device and a wireless power transmission system with which power can be wirelessly transmitted.

BACKGROUND OF THE INVENTION

As a representative example of a wireless power transmission system, a magnetic-field-coupling-type power transmission system that transmits power by utilizing a magnetic field from a primary coil of a power transmission device to a secondary coil of a power reception device is known. In this system, when power is transmitted by magnetic field coupling, the magnitude of the magnetic flux passing through the coils greatly affects the electromotive force and therefore high accuracy is necessary in the relative positional relationship between the primary coil and the secondary coil. In addition, coils are utilized and therefore it difficult to reduce the size of the devices.

On the other hand, an electric-field-coupling-type wireless power transmission system is also known, such as that disclosed in Patent Document 1. The power transmission system described in Patent Document 1 is formed of a power transmission device and a power reception device equipped with passive and active electrodes. The active electrode of the power transmission device and the active electrode of the power reception device are brought close to each other with a gap therebetween, whereby a strong electric field is formed between the two electrodes and the electrodes undergo electric field coupling. Thus, it is possible to transmit power with high transmission efficiency between the power transmission device and the power reception device. In the system described in Patent Document 1, the degree of relative positional accuracy required for the coupling electrodes is comparatively low and it is possible to reduce the size and the thickness of the coupling electrodes.

Patent Document 1: Japanese Unexamined Patent Application Publication (Translation of PCT Application) No. 2009-531009

An example of the above-described power reception device is an electronic appliance such as a cellular phone or a mobile PC. In recent years, progress has been made in the reducing the size and thickness of such electronic appliances and since a large number of necessary elements such as communication antennas have already been incorporated thereinto, it is difficult to additionally secure space in which to arrange coupling electrodes for power transmission.

SUMMARY OF THE INVENTION

Accordingly, an object of the present invention is to provide a power reception device, a power transmission device and a wireless power transmission system with which wireless power transmission can be realized without obstructing size reduction by giving a single member two functions.

A power reception device according to the present invention includes a loop-shaped conductor, a communication circuit that performs short range communication with the outside via the loop-shaped conductor, a power reception circuit that receives power received by the loop-shaped conductor which is capacitively coupled with a first outer electrode, and switching means that switches to a short range communication state in which short range communication state is performed via the loop-shaped conductor or a power reception state in which power is received via the loop-shaped conductor.

With this configuration, since the loop-shaped conductor can be made to function as a capacitive coupling electrode or an antenna, two functions can be given to a single component and therefore an increase in the number of components can be suppressed. Thus, a decrease in the size of the power reception device can be realized.

The power reception device according to the present invention may have a configuration in which the loop-shaped conductor has a first end and a second end, the switching means includes first switching means that connects the first end of the loop-shaped conductor to the communication circuit or the power reception circuit, and second switching means that switches between connecting and disconnecting the second end of the loop-shaped conductor and the communication circuit to and from each other, and the switching means switches to the short range communication state in which the second switching means is connected to the communication circuit and the first switching means is connected to the communication circuit, or the power reception state in which the second switching means is disconnected and the first switching means is connected to the power reception circuit.

With this configuration, the function of the loop-shaped conductor can be switched by switching control performed by the switching means.

The power reception device according to the present invention may have a configuration that includes detection means that detects which of the short range communication state and the power reception state is to be used, and in which the switching means performs switching on the basis of a detection result of the detection means.

With this configuration, the function of the loop-shaped conductor can be automatically switched by switching of the switching means in accordance with the detection result of the detection means.

The power reception device according to the present invention may have a configuration in which the switching means includes a first filter that is provided between the loop-shaped conductor and the communication circuit, allows a signal of a communication frequency of the communication circuit to pass therethrough and cuts a signal of a power reception frequency of the power reception circuit, and a second filter that is provided between the loop-shaped conductor and the power reception circuit, allows the signal of the power reception frequency of the power reception circuit to pass therethrough and cuts the signal of the communication frequency of the communication circuit.

With this configuration, a signal can be allowed to pass or be cut by the first or second filter and therefore the function of the loop-shaped conductor can be automatically switched.

The power reception device according to the present invention may have a configuration which includes a flat-plate-shaped coupling electrode that faces or is in contact with a second outer electrode and is connected to the power reception circuit and in which a voltage generated between the loop-shaped conductor and the coupling electrode is applied to the power reception circuit.

The power reception device according to the present invention may have a configuration in which the coupling electrode is provided such that a direction normal thereto coincides with a winding axis direction of the loop-shaped conductor and such that the loop-shaped conductor is arranged on a first outer electrode and second outer electrode side of the coupling electrode, and the area of the coupling electrode is larger than a planar area of the loop-shaped conductor.

In this configuration, the loop-shaped conductor and the coupling electrode are arranged substantially along a straight line with the first and second outer electrodes and therefore the degree of freedom of the position at which the power reception device is to be placed with respect to the device having the first and second outer electrodes is improved. In addition, since the area of the coupling electrode is larger than that of the loop-shaped conductor, the loop-shaped conductor is at a higher potential than the coupling electrode.

According to the present invention, the loop-shaped conductor can be used as an antenna for short range communication or as an electrode for electric field coupling at the time of power transmission. Thus, a single member can be given two functions and therefore the number of components within the device can be reduced and a reduction in size of the device can be realized.

DETAILED DESCRIPTION OF THE PREFERRED EMBODIMENTS

Embodiment 1

A wireless power transmission system according to embodiment 1 includes a mobile terminal device having a radio frequency identification (RFID) tag, a reader/writer device (hereafter referred to as an R/W device) that reads data from the RFID tag or writes data to the RFID tag and a power transmission device that wirelessly transmits power to the mobile terminal device. Examples of a mobile terminal device include a cellular phone, a mobile PC and a personal digital assistant (PDA), but in this embodiment description will be given for a cellular phone.

Figure 1:
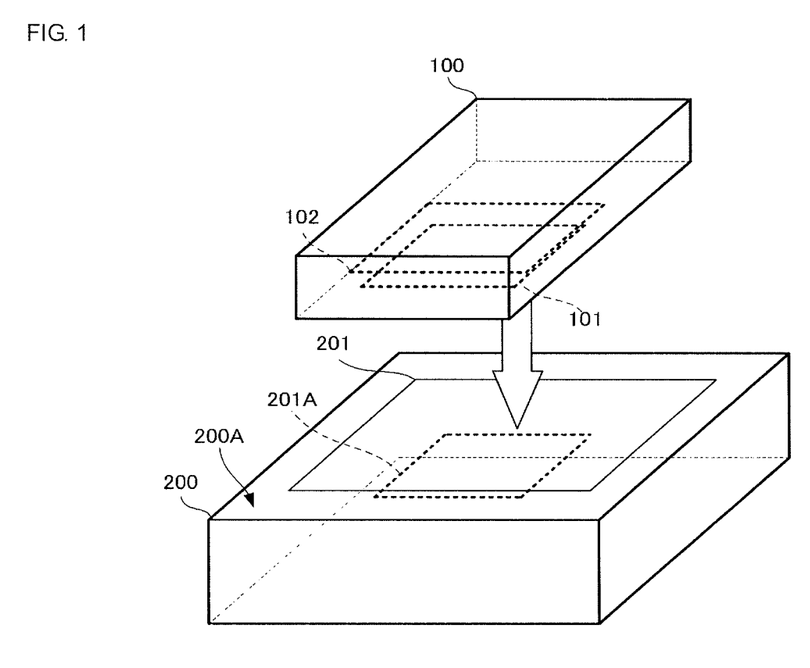
FIG. 1 is a schematic perspective view illustrating a state in which a mobile terminal device according to embodiment 1 is placed on an R/W device.
Figure 2:
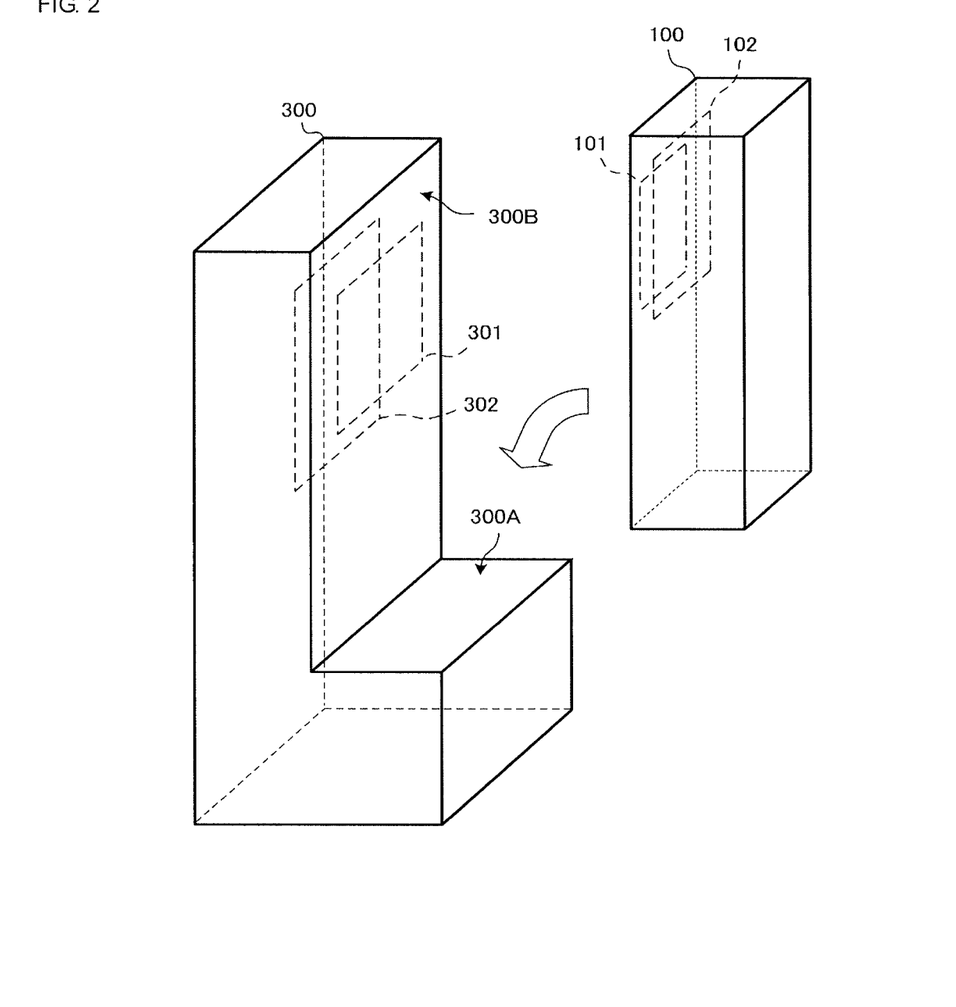
FIG. 2 is a schematic perspective view illustrating a state in which a mobile terminal device according to embodiment 1 is placed on a power transmission device.
Figure 3A:
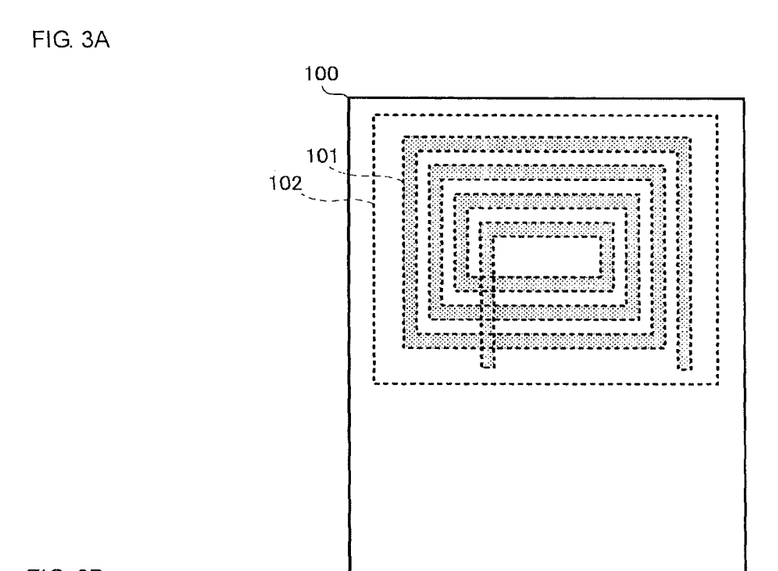
FIG. 3A is a rear view of a mobile terminal device.
Figure 3B:
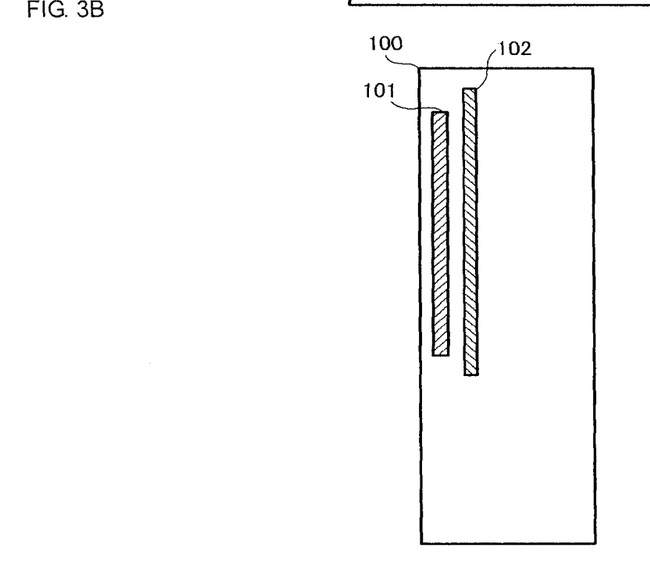
FIG. 3B is a lateral sectional view of a mobile terminal device.

FIG. 1 is a schematic perspective view illustrating a state in which the mobile terminal device according to embodiment 1 is held over the R/W device. FIG. 2 is a schematic perspective view illustrating a state in which the mobile terminal device according to embodiment 1 is placed on the power transmission device. FIG. 3A is a rear view of the mobile terminal device and FIG. 3B is a lateral sectional view of the mobile terminal device. A surface on which a liquid crystal screen and an operation unit are provided is a front surface of the mobile terminal device and the opposite surface is a back surface.

An R/W device 200 is a device that performs short range communication with a mobile terminal device (power reception device) 100 and has a placing surface 200A on which the mobile terminal device 100 is placed and a data reader/writer unit (hereafter referred to as data R/W unit) 201 formed at the placing surface 200A. The data R/W unit 201 has an antenna 201A that communicates with the mobile terminal device 100. The data R/W unit 201 receives tag information recorded in the RFID tag of the mobile terminal device 100 or transmits commands or tag information to the RFID tag via the antenna 201A.

When communication is performed between the mobile terminal device 100 and the R/W device 200, it is not necessary for the mobile terminal device 100 to be in close contact with the R/W device 200 and the mobile terminal device 100 may be in a state of facing the data R/W unit 201 of the R/W device 200 with a gap therebetween.

A power transmission device 300 has a placing surface 300A that is substantially parallel to its installation surface and a backrest surface 300B that is substantially orthogonal to the placing surface 300A. The mobile terminal device 100 is placed on the placing surface 300A of the power transmission device 300. The power transmission device 300 is equipped with an active electrode (first outer electrode) 301 that is provided parallel to the backrest surface 300B. In addition, the power transmission device 300 is equipped with a passive electrode (second outer electrode) 302 that is parallel to the active electrode 301 such that the active electrode 301 lies between the passive electrode 302 and the backrest surface 300B. The active electrode 301 and the passive electrode 302 are each substantially rectangular in shape and the passive electrode 302 is larger than the active electrode 301.

When the mobile terminal device 100 is placed on the placing surface 300A of the power transmission device 300, the active electrode 301 faces a coil antenna (loop-shaped conductor) 101 of the mobile terminal device 100, which will be described below, with a gap interposed therebetween and the passive electrode 302 faces a metal plate 102 of the mobile terminal device 100 with a gap interposed therebetween. A voltage is applied to the active electrode 301 and the passive electrode 302, whereby the active electrode 301 becomes capacitively coupled with the coil antenna 101 of the mobile terminal device 100 and the passive electrode 302 becomes capacitively coupled with the metal plate 102 of the mobile terminal device 100. Thus, power is transmitted from the power transmission device 300 to the mobile terminal device 100. So long as the active electrode 301 and the coil antenna 101 are capacitively coupled, an insulator may lie therebetween rather than the above-mentioned gap.

The mobile terminal device 100 includes a secondary battery and an RFID tag. The RFID tag is operated using the secondary battery and functions when a signal from the R/W device 200 is detected. The RFID tag includes the coil antenna 101. The coil antenna 101, as illustrated in FIG. 3A, is formed from a conductive member so as to loop in a spiral shape parallel to a back surface of a casing. One end of the coil antenna 101, although not illustrated, is made open or is connected to an RFID IC circuit by switching of a switch. In addition, the other end of the coil antenna 101 is connected to a power reception circuit or the RFID IC circuit by switching of a switch. The switches are switched in accordance with whether the mobile terminal device 100 is placed on the R/W device 200 or the power transmission device 300. The coil antenna 101 functions as an RFID antenna that communicates with the R/W device 200 or functions as an active electrode that is capacitively coupled with the active electrode 301 of the power transmission device 300 in accordance with the switching of the switches. The coil antenna 101 employs a flat-plate-shaped conductor (conductive member) having a long narrow shape and a thickness that is smaller than its line width and may be a thin flat-plate-shaped coil.

In addition, the mobile terminal device 100, as illustrated in FIG. 3B, includes the metal plate (coupling electrode) 102, which is provided such that a direction normal thereto coincides with a winding axis direction of the coil antenna 101 and so that the coil antenna 101 lies between the metal plate 102 and the back surface. The metal plate 102 has a larger diameter than the coil antenna 101. When power is transmitted to the mobile terminal device 100 from the power transmission device 300, the metal plate 102 is capacitively coupled with the passive electrode 302 of the power transmission device 300. When the coil antenna 101 functions as an active electrode, the coil antenna 101 is capacitively coupled with the active electrode 301 of the power transmission device 300. Thus, a charging circuit included in a power reception circuit of the mobile terminal device 100 charges the secondary battery with power received from the power transmission device 300.

In this embodiment, the passive electrode 302, the active electrode 301, the coil antenna 101 and the metal plate 102 are formed so as to be capacitively coupled with one another by being arranged along substantially a straight line. That is, the mobile terminal device 100 may be placed on the power transmission device 300 with a single point serving as a reference. For example, if the active electrode 301 and the passive electrode 302 were arranged next to each other parallel to the backrest surface 300B, it would be necessary to place the mobile terminal device 100 on the power transmission device 300 using two points as references, whereas the degree of freedom when placing the mobile terminal device 100 is improved compared to this case.

The metal plate 102 may be a separate component. In addition, for example, a configuration may be adopted in which part of a metal case provided on a wiring board or a ground pattern formed on a wiring board may be employed as the metal plate 102.

Figure 4:
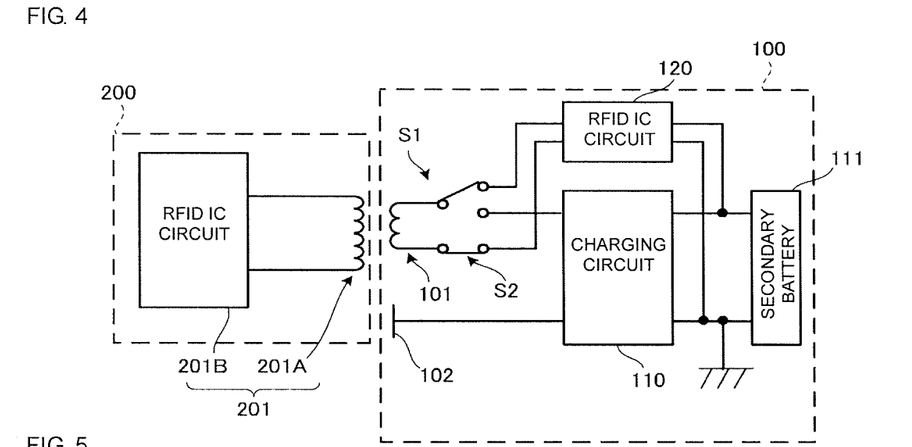
FIG. 4 is a circuit diagram of a wireless power transmission system.
Figure 5:
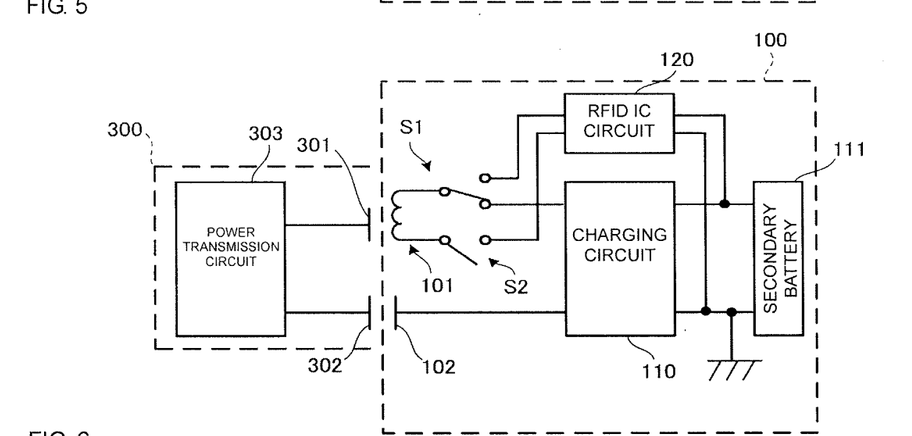
FIG. 5 is a circuit diagram of a wireless power transmission system.

Hereafter, the circuit configurations of the mobile terminal device 100, the R/W device 200 and the power transmission device 300 will be described. FIG. 4 and FIG. 5 are circuit diagrams of a wireless power transmission system. FIG. 4 illustrates a case in which the mobile terminal device 100 is placed on the R/W device 200. FIG. 5 illustrates a case in which the mobile terminal device 100 is placed on the power transmission device 300.

The R/W device 200 includes the data R/W unit 201 and other circuits (for example, a control circuit or a power supply circuit). The data R/W unit 201 includes the antenna 201A and an RFID IC circuit 201B. The RFID IC circuit 201B causes a magnetic field to be generated by making a current flow through the antenna 201A and receives tag information stored on the RFID tag of the mobile terminal device 100 from the mobile terminal device 100 or transmits a command or tag information to the mobile terminal device 100. The RFID IC circuit 201B for example may be configured such that a current flows when placing of the mobile terminal device 100 on the data R/W unit 201 is detected by a sensor, such that a current flows when an operation performed by a user is received, or such that a current flows all the time.

The power transmission device 300 illustrated in FIG. 5 includes a power transmission circuit 303. The power transmission circuit 303 includes an AC adapter, a voltage generation circuit and so forth and the active electrode 301 and the passive electrode 302 are connected to the power transmission circuit 303. The AC adapter converts an alternating current voltage of 100 V to 230 V into a direct current voltage of for example 5V or 12 V and outputs the direct current voltage to the voltage generation circuit. The voltage generation circuit is formed of an inverter, a step-up transformer and an inductor, subjects to alternating current conversion and steps up a voltage input from the AC adapter and applies the resulting voltage between the active electrode 301 and the passive electrode 302. The frequency of the applied voltage is 100 kHz to 10 MHz.

The mobile terminal device 100 includes a charging circuit (power reception circuit) 110, an RFID IC circuit (communication circuit) 120 and switches S1 and S2. The switch (first switching means) S1 is equipped with three input/output terminals and these terminals are connected to one end (first end) of the coil antenna 101, the RFID IC circuit 120 and the charging circuit 110. The switch S1 connects one end of the coil antenna 101 to the charging circuit 110 or the RFID IC circuit 120. Specifically, when the mobile terminal device 100 is placed on the R/W device 200, the switch S1 connects the coil antenna 101 to the RFID IC circuit 120. In addition, when the mobile terminal device 100 is placed on the power transmission device 300, the switch S1 connects the coil antenna 101 to the charging circuit 110. The type of element that forms the switch S1 such as a relay switch or an FET is not particularly limited.

The switch (second switching means) S2 is connected between the other end (second end) of the coil antenna 101 and the RFID IC circuit 120. When the mobile terminal device 100 is placed on the power transmission device 300, the switch S2 is switched off and the coil antenna 101 and the RFID IC circuit 120 are disconnected. That is, one end of the coil antenna 101 is an open end. In addition, when the mobile terminal device 100 is placed on the R/W device 200, the switch S2 is switched on and connects the coil antenna 101 to the RFID IC circuit 120. The type of element that forms the switch S2 is not particularly limited similarly to the switch S1.

The charging circuit 110 charges a secondary battery ill with power transmitted from the power transmission device 300. The charging circuit 110 is connected to the one end of the coil antenna 101 via the switch S1 and to the metal plate 102. The charging circuit 110 may include a rectifier circuit that converts a received alternating current power into direct current power, a smoothing circuit, a voltage stabilizing circuit and so forth.

The RFID IC circuit 120 is connected to the coil antenna 101 via the switches S1 and S2. The RFID IC circuit 120 operates with the power of the secondary battery 111. The RFID IC circuit 120 includes a memory and transmits tag information recorded in the memory to the R/W device 200 via the coil antenna 101 or receives a command transmitted from the R/W device 200, starts up and controls the tag, and stores received tag information in the memory.

When the mobile terminal device 100 is placed on the R/W device 200, as illustrated in FIG. 4, the switch S1 is connected to the RFID IC circuit 120 side and the switch S2 is switched on. Thus, the coil antenna 101 is connected to the RFID IC circuit 120 and is not connected to the charging circuit 110. The RFID IC circuit 120 communicates with the R/W device 200 via the coil antenna 101.

On the other hand, when the mobile terminal device 100 is placed on the power transmission device 300, as illustrated in FIG. 5, the switch S1 is connected to the charging circuit 110 side and the switch S2 is switched off. Thus, one end of the coil antenna 101 is connected to the charging circuit 110 and the other end of the coil antenna 101 is an open end. As a result, the coil antenna 101 can be used as a flat-plate-shaped electrode. The coil antenna 101 faces the active electrode 301 of the power transmission device 300 and is capacitively coupled with the active electrode 301. In addition, the metal plate 102 of the mobile terminal device 100 faces the passive electrode 302 of the power transmission device 300 and is capacitively coupled with the passive electrode 302. Thus, power is transmitted from the power transmission device 300 to the mobile terminal device 100 and the charging circuit 110 charges the secondary battery 111 with the transmitted power.

Thus, the mobile terminal device 100 can make the coil antenna 101 function as an active electrode for capacitive coupling with the power transmission device 300, and can make the coil antenna 101 function as an antenna for communicating with the R/W device 200 by appropriately switching the switches S1 and S2. That is, a single component can be given two functions and therefore size reduction of the mobile terminal device 100 can be realized.

Figure 6:
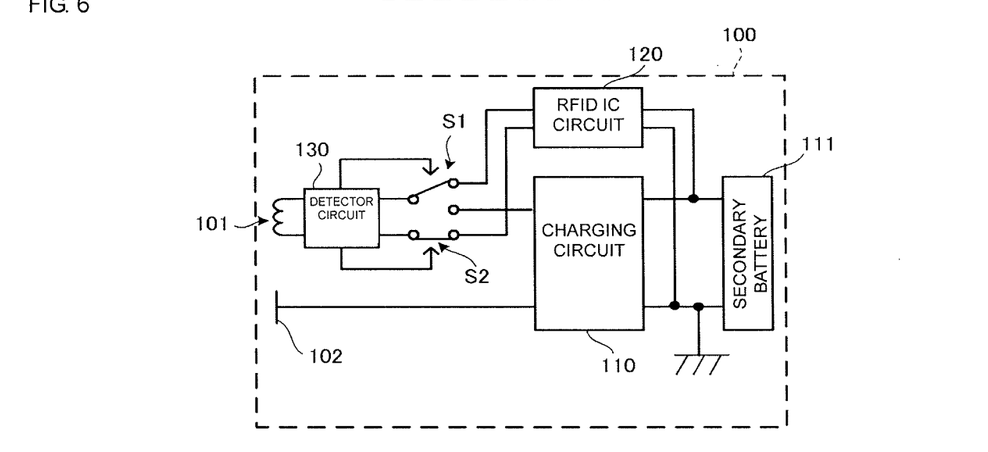
FIG. 6 is a circuit diagram illustrating another example of a mobile terminal device according to embodiment 1.

The switches S1 and S2 may be switched automatically or manually. FIG. 6 is a circuit diagram illustrating another example of the mobile terminal device 100 according to embodiment 1. The mobile terminal device 100 illustrated in FIG. 6 includes a detector circuit (detection means) 130 between the coil antenna 101 and the switches S1 and S2. The detector circuit 130 includes means for detecting a signal flowing from the coil antenna 101 and means for controlling switching of the switches S1 and S2, and discriminates between received signals and switches the switches S1 and S2. The detector circuit 130 for example discriminates between the types of signals on the basis of the frequencies of the received signals. In addition, the detector circuit 130 discriminates whether the mobile terminal device 100 is placed on the R/W device 200 or the power transmission device 300.

In addition, the mobile terminal device 100 may include a sensor that detects whether the mobile terminal device 100 is placed on the R/W device 200 or the power transmission device 300 and switch the switches S1 and S2 in accordance with a detection result of the sensor.

Embodiment 2

A wireless power transmission system according to the following embodiment 2 includes an RFID tag, a mobile terminal device and a power transmission device. The mobile terminal device according to this embodiment does not include an RFID tag and the power transmission device has both the functions of an R/W device and a wireless power transmission device. The power transmission device functions as an R/W device when an RFID tag is placed thereon and functions as a power transmission device when a mobile terminal device is placed thereon. Hereafter, the differences from embodiment 1 will be described.

Figure 7:
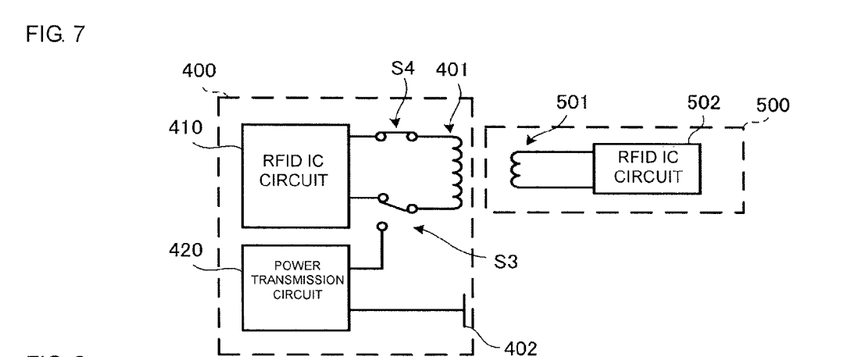
FIG. 7 is a circuit diagram of a wireless power transmission system according to embodiment 2.
Figure 8:
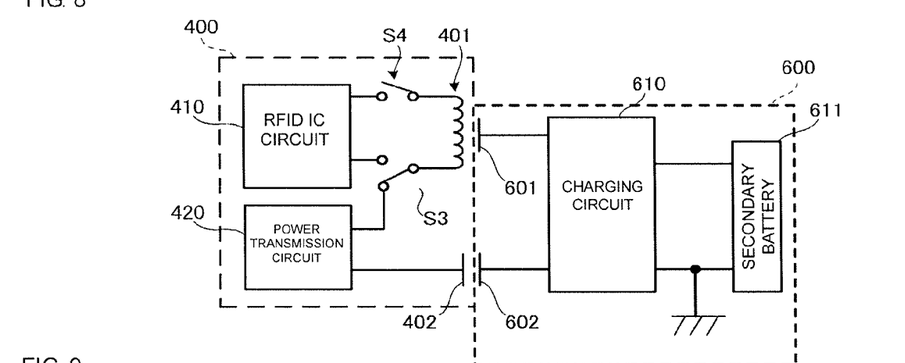
FIG. 8 is a circuit diagram of a wireless power transmission system according to embodiment 2.

FIG. 7 and FIG. 8 are circuit diagrams of the wireless power transmission system according to embodiment 2. FIG. 7 illustrates a case in which the power transmission device functions as an R/W device. FIG. 8 illustrates a case in which the power transmission device functions as a wireless power transmission device.

An RFID tag 500 includes an RFID antenna 501 and an RFID IC circuit 502. The RFID IC circuit 502 has substantially the same configuration as the RFID IC circuit 120 of embodiment 1, but the RFID IC circuit 502 operates in response to a current flowing due to electromagnetic induction caused by a magnetic field generated by a current flowing through a coil antenna 401 of a power transmission device 400, which will be described later. The RFID IC circuit 502 transmits tag information stored in a memory or the like to the power transmission device 400 and receives commands from the power transmission device 400 via the RFID antenna 501, performs an operation in response thereto, and receives and writes tag information into the memory.

A mobile terminal device 600 is for example a cellular phone and includes an active electrode (third outer electrode) 601, a passive (fourth outer electrode) electrode 602, a charging circuit 610, a secondary battery 611 and other circuits (for example a control circuit). The charging circuit 610 has substantially the same configuration as the charging circuit 110 of embodiment 1 and is connected to the active electrode 601 and the passive electrode 602. The active electrode 601 and the passive electrode 602 are capacitively coupled with the coil antenna 401 and a passive electrode 402 of the power transmission device 400, which will be described later, and the charging circuit 610 charges the secondary battery 611 with the power transmitted from the power transmission device 400.

The power transmission device 400 includes the coil antenna (loop-shaped conductor) 401, the passive electrode 402, an RFID IC circuit 410, a power transmission circuit 420 and switches S3 and S4. In the power transmission device 400, the coil antenna 401 and the passive electrode 402 are arranged similarly to the active electrode 301 and the passive electrode 302 of embodiment 1. That is, the coil antenna 401 and the passive electrode 402 are arranged in this order from the RFID tag 500 or mobile terminal device 600 side. At this time, the winding axis direction of the coil antenna 401 and a direction normal to the passive electrode 402 coincide with each other and the area of the passive electrode 402 is greater than that of the coil antenna 401.

The switch (first switching means) S3 is equipped with three input/output terminals, similarly to the switch S1 of embodiment 1, and these terminals are connected to one end of the coil antenna 401, the RFID IC circuit 410 and the power transmission circuit 420. The switch S3 connects the coil antenna 401 to the RFID IC circuit 410 or the power transmission circuit 420. Specifically, when the RFID tag 500 is placed on the power transmission device 400, the switch S3 connects the coil antenna 401 to the RFID IC circuit 410. In addition, when the mobile terminal device 600 is placed on the power transmission device 400, the switch S3 connects the coil antenna 401 to the power transmission circuit 420.

The switch (second switching means) S4 is connected between the other end of the coil antenna 401 and the RFID IC circuit 410. When the mobile terminal device 600 is placed on the power transmission device 400, the switch S4 is switched off and the coil antenna 401 and the RFID IC circuit 410 are disconnected. That is, one end of the coil antenna 401 is an open end. In addition, when the RFID tag 500 is placed on the power transmission device 400, the switch S4 is switched on and connects the coil antenna 401 to the RFID IC circuit 410.

The RFID IC circuit 410 has the same configuration as the RFID IC circuit 201B of embodiment 1 and is connected to the coil antenna 401 via the switches S3 and S4. The RFID IC circuit 410 for example operates with power from the power transmission circuit 420. The RFID IC circuit 410 causes a current to flow through the coil antenna 401 to cause a magnetic field to be generated and receives stored tag information from the RFID tag 500 or transmits a command or tag information to the RFID tag 500.

The power transmission circuit 420 has the same configuration as the power transmission circuit 303 of embodiment 1 and the passive electrode 402 is connected to the power transmission circuit 420. The power transmission circuit 420 is connected to one end of the coil antenna 401, the other end thereof being open due to switching of the switches S3 and S4, and a voltage is applied between the coil antenna 401 and the passive electrode 402.

When the RFID tag 500 is placed on the power transmission device 400, as illustrated in FIG. 7, the switch S3 is connected to the RFID IC circuit 410 side and the switch S4 is switched on. Thus, the coil antenna 401 is connected to the RFID IC circuit 410 and is not connected to the power transmission circuit 420. Then, the RFID IC circuit 410 communicates with the RFID tag 500 via the coil antenna 401.

On the other hand, when the mobile terminal device 600 is placed on the power transmission device 400, as illustrated in FIG. 8, the switch S3 is connected to the power transmission circuit 420 side and the switch S4 is switched off. Thus, one end of the coil antenna 401 is connected to the power transmission circuit 420 and the other end of the coil antenna 401 is an open end. As a result, the coil antenna 401 operates as a flat-plate-shaped electrode. The coil antenna 401 faces the active electrode 601 of the mobile terminal device 600 and is capacitively coupled with the active electrode 601. In addition, the passive electrode 402 of the power transmission device 400 is capacitively coupled with the passive electrode 602 of the mobile terminal device 600. Thus, power is transmitted from the power transmission device 400 to the mobile terminal device 600 and the charging circuit 610 of the mobile terminal device 600 charges the secondary battery 611 with the transmitted power.

In this way, by appropriately switching the switches S3 and S4, the power transmission device 400 can make the coil antenna 401 function as an active electrode for capacitive coupling with the mobile terminal device 600 and can make the coil antenna 401 function as an antenna for communicating with the RFID tag 500. That is, a single component can be given two functions and therefore an increase in size of the power transmission device 400 can be prevented.

The switches S3 and S4 may be switched automatically or manually as with the switches S1 and S2 of embodiment 1. For example, a configuration may be adopted in which, in a state where the switch S3 is connected to the RFID IC circuit 416 side and the switch S4 is switched on, when the detection means of the power transmission device 400 detects a signal from the mobile terminal device 600, the switch S3 is connected to the power transmission circuit 420 side and the switch S4 is switched off.

Embodiment 3

Figure 9:
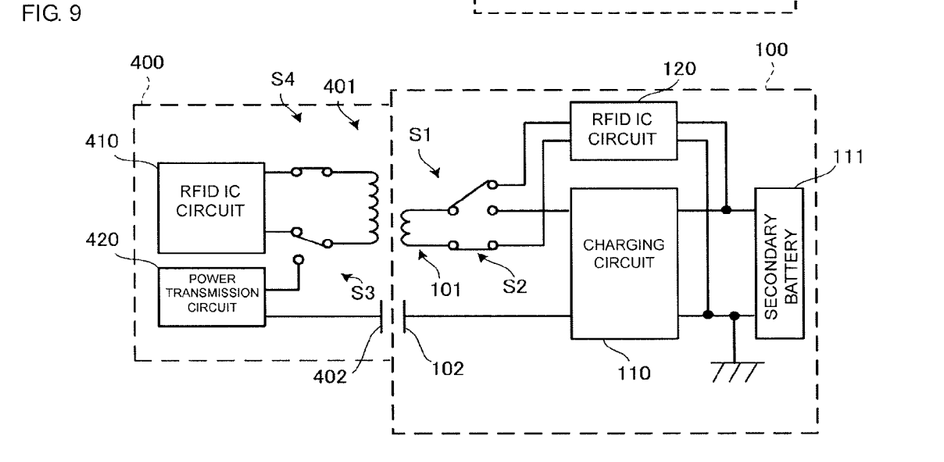
FIG. 9 is a circuit diagram of a wireless power transmission system according to embodiment 3.
Figure 10:
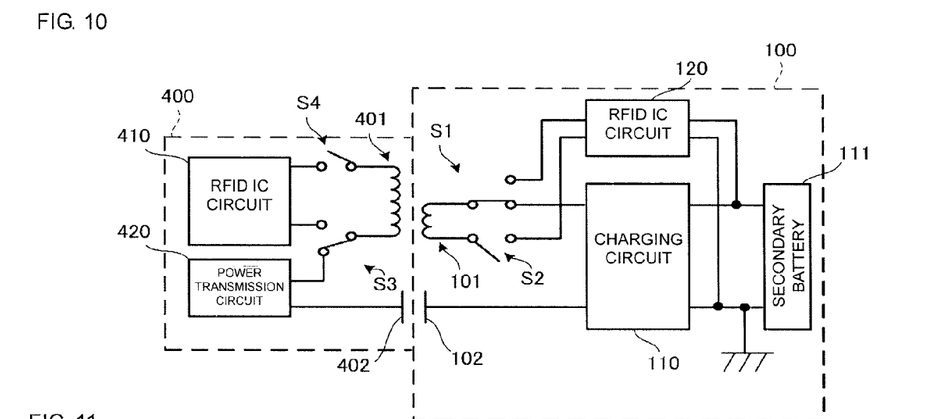
FIG. 10 is a circuit diagram of a wireless power transmission system according to embodiment 3.

A wireless power transmission system according to embodiment 3 includes the mobile terminal device 100 of embodiment 1 and the power transmission device 400 of embodiment 2. FIG. 9 and FIG. 10 are circuit diagrams of the wireless power transmission system according to embodiment 3. FIG. 9 illustrates a case in which the power transmission device functions as an R/W device. FIG. 10 illustrates a case in which the power transmission device functions as a wireless power transmission device. The configurations of the mobile terminal device 100 and the power transmission device 400 are the same as those of embodiments 1 and 2 and therefore description thereof will be omitted.

When the power transmission device 400 is made to function as an R/W device, as illustrated in FIG. 9, the switch S3 is connected to the RFID IC circuit 410 side and the switch S4 is switched on. Thus, the coil antenna 401 is connected to the RFID IC circuit 410 and is not connected to the power transmission circuit 420. On the other hand, in the mobile terminal device 100, the switch S2 is switched on and the switch S1 is connected to the RFID IC circuit 120 side. Thus, the RFID IC circuit 410 of the power transmission device 400 communicates with the RFID IC circuit 120 of the mobile terminal device 100 via the coil antenna 401.

When the power transmission device 400 is made to function as a power transmission device, as illustrated in FIG. 10, the switch S3 is connected to the power transmission circuit 420 side and the switch S4 is switched off. Thus, one end of the coil antenna 401 is connected to the power transmission circuit 420 and the other end of the coil antenna 401 is an open end. In the mobile terminal device 100, the switch S1 is connected to the charging circuit 110 side and the switch S2 is switched off. Then, as a result of capacitive coupling of the coil antenna 401 of the power transmission device 400 and the coil antenna 101 of the mobile terminal device 100, power is transmitted from the power transmission device 400 to the mobile terminal device 100 and the charging circuit 110 of the mobile terminal device 100 charges the secondary battery 111 with the transmitted power.

As described above, a single component is made to have two functions, whereby a reduction in size of the mobile terminal device 100 can be realized and an increase in size of the power transmission device 400 can be prevented.

Embodiment 4

Embodiment 4 differs from embodiment 1 in that filters are employed instead of the switches S1 and S2 of embodiment 1. This difference will be described hereafter.

Figure 11:
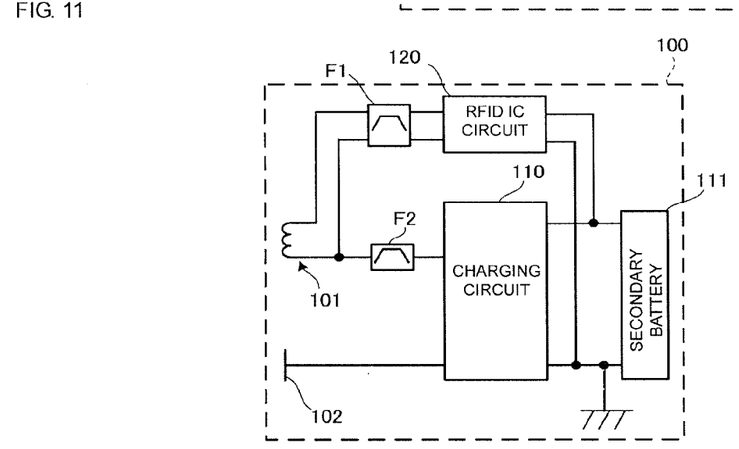
FIG. 11 is a circuit diagram of a mobile terminal device according to embodiment 4.

FIG. 11 is a circuit diagram of a mobile terminal device 100 according to embodiment 4. In this embodiment, an RFID communication frequency (first frequency) is 13 MHz and a frequency of wirelessly transmitted power (second frequency) is 200 kHz.

The mobile terminal device 100 includes filters F1 and F2. The filter (first filter) F1 is connected between the two ends of the coil antenna 101 and the RFID IC circuit 120. The filter F1 is a band pass filter having a center frequency of 13 MHz. The filter (second filter) F2 is connected between one end of the coil antenna 101 and the charging circuit 110. The filter F2 is a band pass filter having a center frequency of 200 kHz.

When the mobile terminal device 100 is placed on the R/W device 200 of embodiment 1, a signal transmitted from the R/W device 200 passes through the filter F1 but does not pass through the filter F2. That is, a state exists in which the charging circuit 110 side is open. On the other hand, when the mobile terminal device 100 is placed on the power transmission device 300, a power signal transmitted from the power transmission device 300 passes through the filter F2 but does not pass through the filter F1. That is, a state exists in which the RFID IC circuit 120 side is open. Therefore, the charging circuit 110 and the RFID IC circuit 120 are isolated from each other and operate independently of each other in accordance with the frequency. Thus, the coil antenna 101 functions as an antenna of the RFID IC circuit 120 and functions as an active electrode for transmission of power.

As described above, in embodiment 4, the functions of the coil antenna 101 are switched between by using the filters which replace the switches. In this case, it is not necessary to perform switch control and the number of components or cost can be reduced. The filters F1 and F2 need not be band pass filters and may be band elimination filters, high pass filters or low pass filters. In addition, the center frequencies of the filters F1 and F2 are appropriately changed in accordance with the intended application.

In addition, the filter F1 may be a common mode choke filter. In a common mode choke filter, two coils are wound around a ferrite core, and when currents of the same phase flow through the coils, the generated magnetic fields reinforce each other inside the ferrite core. As a result, impedance is increased and only same phase signal components are removed. In the case where power is transmitted, a signal is cut by the common mode choke filter and the coil antenna 101 functions as an active electrode.

Appropriate design modifications can be made to the specific configurations of the devices constituting the wireless power transmission system and the operations and effects detailed in the above-described embodiments are merely examples of most suitable operations and effects generated from the present invention and the operations and effects of the present invention are not limited to those detailed in the above-described embodiments.

Figure 12:
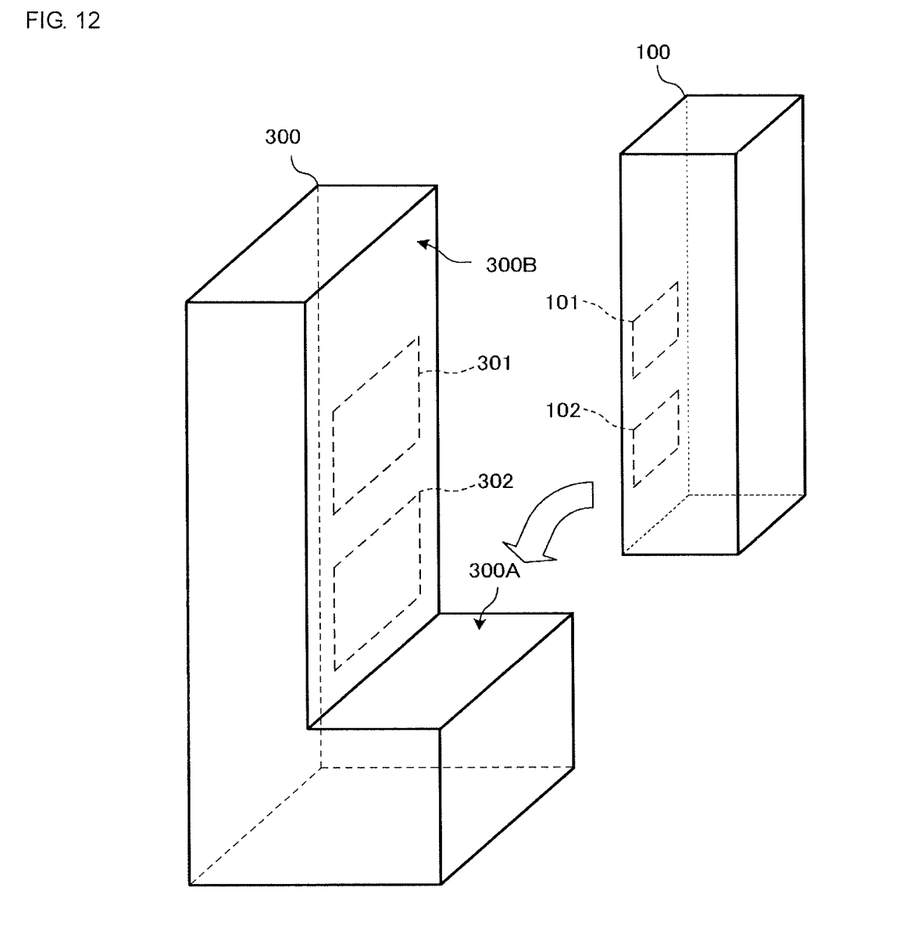
FIG. 12 shows a mobile terminal device according to embodiment 4.

For example, in embodiment 1, a configuration is adopted in which the active electrode 301 of the power transmission device 300 and coil antenna 101 of the mobile terminal device 100, which are capacitively coupled with each other, lie between the passive electrode 302 of the power transmission device 300 and the metal plate 102 of the mobile terminal device 100, but the positioning of the electrodes is not limited to this configuration. FIG. 12 is a schematic view illustrating another example configuration of the mobile terminal device 100 and the power transmission device 300. FIG. 12 corresponds to FIG. 2.

In FIG. 12, the active electrode 301 and the passive electrode 302 are formed in the same plane parallel to the backrest surface 300B. In addition, in the mobile terminal device 100, the coil antenna 101 and the metal plate 102 are formed in the same plane parallel to the back surface of the mobile terminal device 100. In this case as well, the active electrode 301 and the coil antenna 101 face each other and the passive electrode 302 and the metal plate 102 face each other. Then, the respective electrodes are capacitively coupled with each other and power is transmitted from the power transmission device 300 to the mobile terminal device 100.

REFERENCE SIGNS LIST

100—mobile terminal device (power reception device)
101—coil antenna (loop-shaped conductor)
110—charging circuit (power reception circuit)
120—RFID IC circuit (communication circuit)
200—R/W device
300—power transmission device
301—active electrode (first outer electrode)
S1, S3—switch (first switching means)
S2, S4—switch (second switching means)

The invention claimed is:

1. A power reception device comprising:
a single loop-shaped conductor;
a communication circuit configured to wirelessly communicate data via the single loop-shaped conductor;
a power reception circuit configured to receive power from the single loop-shaped conductor when the single loop-shaped conductor is capacitively coupled with an active electrode of a power transmission device;
a switching circuit configured to electrically couple the single loop-shaped conductor to the communication circuit in a data communication state and to electrically couple the single loop-shaped conductor to the power reception circuit in a power reception state; and
a coupling electrode that is electrically insulated from the single loop-shaped conductor and that faces a passive electrode of the power transmission device when the single loop-shaped conductor is capacitively coupled with the active electrode of the power transmission device,
wherein a voltage generated between the single loop-shaped conductor and the coupling electrode is applied to the power reception circuit.

2. The power reception device according to claim 1,
wherein the single loop-shaped conductor includes a first end and a second end,
wherein the switching circuit includes a first switch that selectively connects the first end of the single loop-shaped conductor to the communication circuit or the power reception circuit, and a second switch that selectively connects the second end of the single loop-shaped conductor to the communication circuit,
wherein, when the power reception device is in the data communication state, the second switch connects the second end of the single loop-shaped conductor to the communication circuit, and the first switch connects the first end of the single loop-shaped conductor to the communication circuit, and
wherein, when the power reception device is in the power reception state, the second switch disconnects the second end of the single loop-shaped conductor from the communication circuit, and the first switch connects the first end of the single loop-shaped conductor to the power reception circuit.

3. The power reception device according to claim 1, further comprising:
a detection circuit configured to generate a detection signal that indicates whether the single loop-shaped conductor is receiving a data communication signal or a power transmission signal, and wherein the switching circuit is configured to switch the power reception device to one of the power reception state and the data communication state based on the detection signal.

4. The power reception device according to claim 1, wherein the switching circuit includes:
a first filter coupled between the single loop-shaped conductor and the communication circuit, the first filter configured to pass a data communication signal having a first frequency to the communication circuit and to block a power reception signal having a second frequency to the power reception circuit, and
a second filter coupled between the single loop-shaped conductor and the power reception circuit, the second filter configured to pass the power reception signal to the power reception circuit and to block the data communication signal from the communication circuit.

5. The power reception device according to claim 1, wherein the coupling electrode is disposed in the power reception device such that a direction normal thereto coincides with a winding axis direction of the single loop-shaped conductor and the single loop-shaped conductor is disposed adjacent to the active electrode side and the passive electrode side of the power transmission device.

6. The power reception device according to claim 5, wherein an area of the coupling electrode is larger than a planar area of the single loop-shaped conductor.

7. A power transmission device comprising:
a single loop-shaped conductor;
a communication circuit configured to wirelessly communicate data via the single loop-shaped conductor;
a power transmission circuit configured to transmit power to an active electrode of a power reception device via the single loop-shaped conductor when the active electrode is capacitively coupled to the single loop-shaped conductor;
a switching circuit configured to electrically couple the single loop-shaped conductor to the communication circuit in a data communication state and to electrically couple the single loop-shaped conductor to the power transmission circuit in a power transmission state; and
a passive electrode of the power transmission device that is electrically insulated from the single loop-shaped conductor and that faces a passive electrode of the power reception device when the single loop-shaped conductor is capacitively coupled with the active electrode of the power reception device,
wherein the single loop-shaped conductor has a first end and a second end,
wherein the switching circuit includes a first switch that selectively connects the first end of the single loop-shaped conductor to the communication circuit or the power transmission circuit, and a second switch that selectively connects the second end of the single loop-shaped conductor to the communication circuit, and
wherein, when the power transmission device is in the data communication state, the first switch connects the first end of the single loop-shaped conductor to the communication circuit and the second switch connects the second end of the single loop-shaped conductor to the communication circuit, and
wherein, when the power transmission device is in the power transmission state, the second switch disconnects the second end of the single loop-shaped conductor from the communication circuit and the first switch connects the first end of the single loop-shaped conductor to the power transmission circuit.

8. The power transmission device according to claim 7, further comprising:
a detection circuit configured to generate a detection signal that indicates whether the single loop-shaped conductor is receiving a data communication signal or a power transmission signal, and
wherein the switching circuit is configured to switch the power transmission device to one of the power transmission state and the data communication stated based on the detection signal.

9. The power transmission device according to claim 7, wherein the passive electrode of the power transmission device is disposed in the power transmission device such that a direction normal thereto coincides with a winding axis direction of the single loop-shaped conductor and that the single loop-shaped conductor is disposed adjacent to the active electrode side and the passive electrode side of the power reception device.

10. The power transmission device according to claim 9, wherein an area of the coupling electrode is larger than a planar area of the single loop-shaped conductor.

11. A wireless power transmission system comprising:
a power transmission device having:
a power transmission side electrode,
a passive electrode, and
a voltage generating circuit configured to apply a voltage to the power transmission side electrode; and
a power reception device having:
a power reception side electrode that is a single loop-shaped conductor and capacitively coupled with the power transmission side electrode,
a power reception circuit configured to receive power from the power transmission device through capacitive coupling of the power reception side electrode,
a communication circuit configured to wireless communicate data via the power reception side electrode,
a switching circuit configured to electrically couple the power reception side electrode to the communication circuit in a communication state and to electrically couple the power reception side electrode to the power reception circuit in a power reception state, and
a coupling electrode that faces the passive electrode of the power transmission device when the power reception side electrode is capacitively coupled with the power transmission side electrode of the power transmission device, and
wherein a voltage generated between the power reception side electrode and the coupling electrode is applied to the power reception circuit.

12. The wireless power transmission system according to claim 11, wherein the power transmission device further comprises:
a communication circuit configured to wirelessly communicate data via the power transmission side electrode;
a power transmission circuit configured to transmit power to the power reception side electrode of the power reception device via the power transmission side electrode, when the power transmission side electrode is capacitively coupled with the power reception side electrode; and
a switching circuit configured to electrically couple the power transmission side electrode to the communication circuit in a data communication state and to electrically couple the power transmission side electrode to the power transmission circuit in a power transmission state.

13. A wireless power transmission system comprising:
a power reception device having a power reception side electrode and a passive electrode; and
a power transmission device having:
    a power transmission side electrode that is a single loop-shaped conductor and capacitively coupled with the power reception side electrode,
    a voltage generating circuit configured to apply a voltage to the power transmission side electrode,
    a communication circuit to wirelessly communicate data via the power transmission side electrode,
    a switching circuit configured to electrically couple the power transmission side electrode to the communication circuit in a data communication state and to electrically couple the power transmission side electrode to the voltage generating circuit in a power transmission state, and
    a passive electrode of the power transmission device that faces the passive electrode of the power reception device when the power transmission side electrode is capacitively coupled with the power reception side electrode,
wherein the single loop-shaped conductor has a first end and a second end,
wherein the switching circuit includes a first switch that selectively connects the first end of the single loop-shaped conductor to the communication circuit or the voltage generating circuit, and a second switch that selectively connects the second end of the single loop-shaped conductor to the communication circuit, and
wherein, when the power transmission device is in the data communication state, the first switch connects the first end of the single loop-shaped conductor to the communication circuit and the second switch connects the second end of the single loop-shaped conductor to the communication circuit, and
wherein, when the power transmission device is in the power transmission state, the second switch disconnects the second end of the single loop-shaped conductor from the communication circuit and the first switch connects the first end of the single loop-shaped conductor to the voltage generating circuit.

14. The wireless power transmission system according to claim 13, wherein the power reception device further comprises:
    a communication circuit configured to wirelessly communicate data via the power reception side electrode;
    a power reception circuit configured to receive power from the power transmission side electrode of the power transmission device via the power transmission side electrode, when the power reception side electrode is capacitively coupled with the power transmission side electrode; and
    a switching circuit configured to electrically couple the power reception side electrode to the communication circuit in a data communication state and to electrically couple the power reception side electrode to the power reception circuit in a power receiving state.

* * * * *